(12) United States Patent
Varela et al.

(10) Patent No.: US 7,686,314 B2
(45) Date of Patent: Mar. 30, 2010

(54) LINKAGE SYSTEM FOR SUSPENSION

(75) Inventors: Tomaz Dopico Varela, Shelby Township, MI (US); Xinyu Wen, Shelby Township, MI (US); Thilagan Abraham, Tamil Nadu (IN); Ragnar H. Ledesma, Sterling Heights, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 219 days.

(21) Appl. No.: 11/652,162

(22) Filed: Jan. 11, 2007

(65) Prior Publication Data
US 2008/0169622 A1 Jul. 17, 2008

(51) Int. Cl.
*B60G 9/00* (2006.01)
*B60G 3/12* (2006.01)

(52) U.S. Cl. .............................. 280/124.116; 267/292; 267/280

(58) Field of Classification Search .......... 280/124.116, 280/124.106, 124.11, 124.128, 124.153; 267/292–294, 280
See application file for complete search history.

(56) References Cited
U.S. PATENT DOCUMENTS

| 3,073,616 A * | 1/1963 | Stump ................. 280/124.116 |
| 3,971,550 A * | 7/1976 | Matsuoka et al. ........... 267/280 |
| 4,032,202 A * | 6/1977 | Ishikawa et al. ............ 384/220 |
| 5,597,173 A * | 1/1997 | Schindler et al. ...... 280/124.147 |
| 6,135,469 A * | 10/2000 | Hulstein et al. ............ 280/86.5 |
| 6,871,862 B2 * | 3/2005 | Chalin ....................... 280/86.5 |
| 7,360,756 B2 * | 4/2008 | Urquidi et al. .............. 267/293 |
| 7,370,853 B2 * | 5/2008 | Urquidi et al. ......... 267/140.15 |
| 2005/0146110 A1 * | 7/2005 | Dudding ............... 280/124.128 |
| 2006/0249922 A1 * | 11/2006 | Hinz .................... 280/124.116 |
| 2008/0018070 A1 * | 1/2008 | Gottschalk ................. 280/86.5 |
| 2008/0048409 A1 * | 2/2008 | Takahashi ............ 280/124.116 |
| 2008/0067771 A1 * | 3/2008 | Varela et al. .......... 280/124.116 |
| 2008/0238015 A1 * | 10/2008 | Duddling et al. ...... 280/124.116 |

* cited by examiner

*Primary Examiner*—Paul N Dickson
*Assistant Examiner*—Drew Brown
(74) *Attorney, Agent, or Firm*—Carlson, Gaskey & Olds

(57) ABSTRACT

At least one end of a longitudinally extending control link arm includes a laterally extending tubular portion that receives a bushing assembly. The tubular portion is used to pivotally secure an end of the control link arm to a vehicle structure or axle component. The bushing assembly is positioned within the tubular portion such that radial stiffness is distributed away from a center of the tubular portion. This configuration provides a high conical rate and provides auxiliary roll stiffness such that a sway bar is not required.

23 Claims, 3 Drawing Sheets

LINKAGE SYSTEM FOR SUSPENSION

TECHNICAL FIELD

The subject invention relates to a control link arm and bushing assembly for a vehicle suspension that is configured to provide desired radial and conical bushing characteristics, as well as auxiliary roll stiffness, such that the need for a sway bar in the vehicle suspension is eliminated.

BACKGROUND OF THE INVENTION

Heavy duty vehicle applications are constantly looking for alternative suspension configurations that provide improved ride characteristics when compared with conventional mechanical suspensions, such as a leaf spring suspension for example. Any alternative suspension must also maintain or provide improved handling performance as compared to the mechanical suspension.

One type of alternative suspension is an air suspension that utilizes air springs to provide a softer ride. One type of air suspension, referred to as a multi-link air suspension, offers improved handling performance as compared to traditional leaf spring suspensions. Multi-link air suspensions include longitudinally extending control link arms that are mounted to vehicle and axle structures with bushings.

One disadvantage with such an air suspension is that a sway bar is required to provide needed auxiliary roll stiffness. The sway bar extends in a lateral direction and is typically connected to control link arms that are laterally opposed from each other. The addition of a sway bar to the suspension significantly increases the overall weight of the suspension, making it difficult for this type of suspension to be competitive. Additionally, future emission and braking regulations may make this type of air suspension even more unattractive due to the additional weight of the sway bar.

Thus, there is a need for an improved linkage system that is configured to provide desired bushing characteristics, as well as auxiliary roll stiffness, such that the need for a sway bar in such a suspension is eliminated.

SUMMARY OF THE INVENTION

A control link arm for a multi-link suspension extends in a longitudinal direction. At least one end of the control link arm includes a tubular portion that extends in a lateral direction. The tubular portion receives a bushing assembly such that the control link arm can be pivotally secured to a vehicle structure or axle component. The bushing assembly is positioned within the tubular portion such that radial stiffness is distributed away from a center of the tubular portion. This configuration provides a high conical rate and provides auxiliary roll stiffness such that a sway bar is no longer required for the multi-link suspension.

In one example, tubular portions are formed at both ends of the control link arm. Thus, one tubular portion is used to connect the control link arm to a vehicle structure and another tubular portion is used to connect the control link arm to an axle component. A bushing assembly is received in each tubular portion.

The tubular portion has a central bore that is defined by an inner wall surface. In one example, the bushing assembly includes a first bushing component positioned within one end of the central bore and a second bushing component positioned within an opposite end of the central bore. The first and second bushing components are laterally spaced apart from each other such that a clearance between the first and second bushing components is provided at a center of the central bore.

This unique configuration distributes radial stiffness of the bushing assembly away from the center of the tubular portion, with this extended lateral spacing helping to build up a desired high conical rate for the bushing assembly. Additionally, this bushing and tubular configuration provides auxiliary roll stiffness when the vehicle suspension goes through roll motion, at a significantly reduced weight when compared to a traditional sway bar arrangement.

These and other features of the present invention can be best understood from the following specification and drawings, the following of which is a brief description.

DETAILED DESCRIPTION OF THE PREFERRED EMBODIMENT

Figure 1:
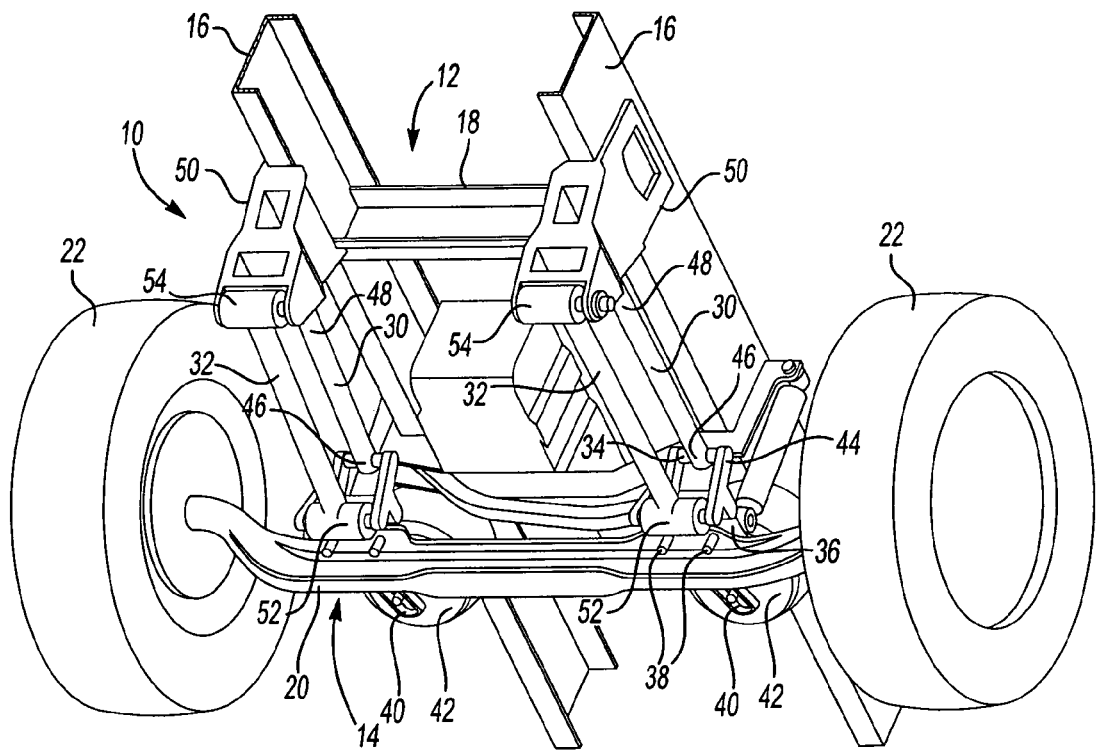
FIG. 1 is a perspective bottom view of a suspension assembly incorporating the subject invention.
Figure 2:
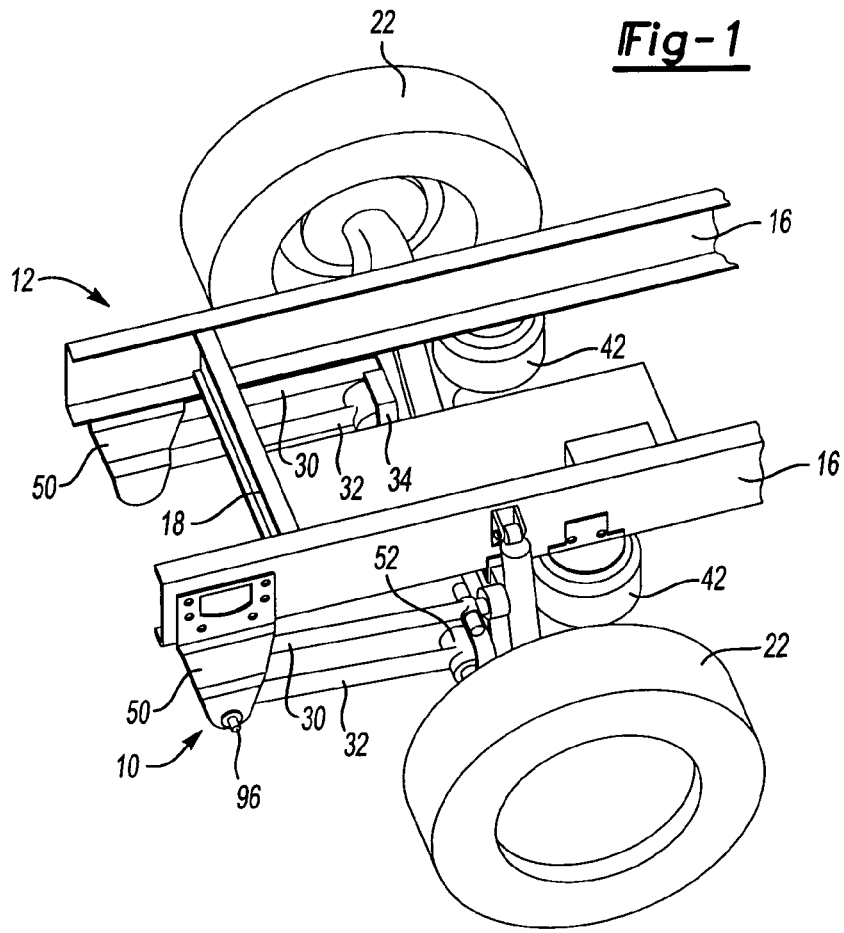
FIG. 2 is a top view of FIG. 1.

FIGS. 1-2 show a suspension 10 that is supported between a vehicle structure 12 and an axle 14. In the example shown, the vehicle structure 12 is comprised of a pair of longitudinally extending beams or c-channels 16 with laterally extending cross-pieces 18 that cooperate with each other to provide a vehicle frame. Also, in the example of FIG. 1, the axle 14 comprises a non-drive steer axle that has a beam 20 extending between laterally spaced wheels 22. It should be understood that the c-channels 16 and non-drive steer axle are merely examples, and that the suspension 10 could be positioned between other types of vehicle structures and other types of axles.

The suspension 10 includes an upper control link arm 30 and a lower control link arm 32 located at each lateral vehicle side of the vehicle. The upper 30 and lower 32 control link arms extend generally in a longitudinal direction along a vehicle length. The upper control link arms 30 are positioned vertically above the lower control link arms 32 as shown in FIG. 1.

A mounting member 34 is used to connect the upper 30 and lower 32 control link arms to the beam 20 at each lateral vehicle side. The mounting member 34 includes an axle mount boss 36 that is secured to the beam 20 with fasteners 38, and a spring support 40 that extends over the beam 20 to support an air spring 42. Thus, the air spring 42 reacts between the c-channel 16 and beam 20 (via spring support 40) to provide a smooth ride. At least one air spring 42 is positioned at each lateral side.

The mounting member 34 also includes a link mounting boss 44. Each upper control link arm 30 includes a first end 46 that is pivotally mounted to the link mounting boss 44 and a second end 48 that is pivotally mounted to a bracket 50 that is mounted to one of the c-channels 16. Each lower control link arm 32 includes a first end 52 that is pivotally mounted to the link mounting boss 44 and a second end 54 that is pivotally mounted to the bracket 50. The first 52 and second 54 ends of the lower control link arms 32 are uniquely configured such that a sway bar is not required to provide auxiliary roll stiffness.

Figure 3:
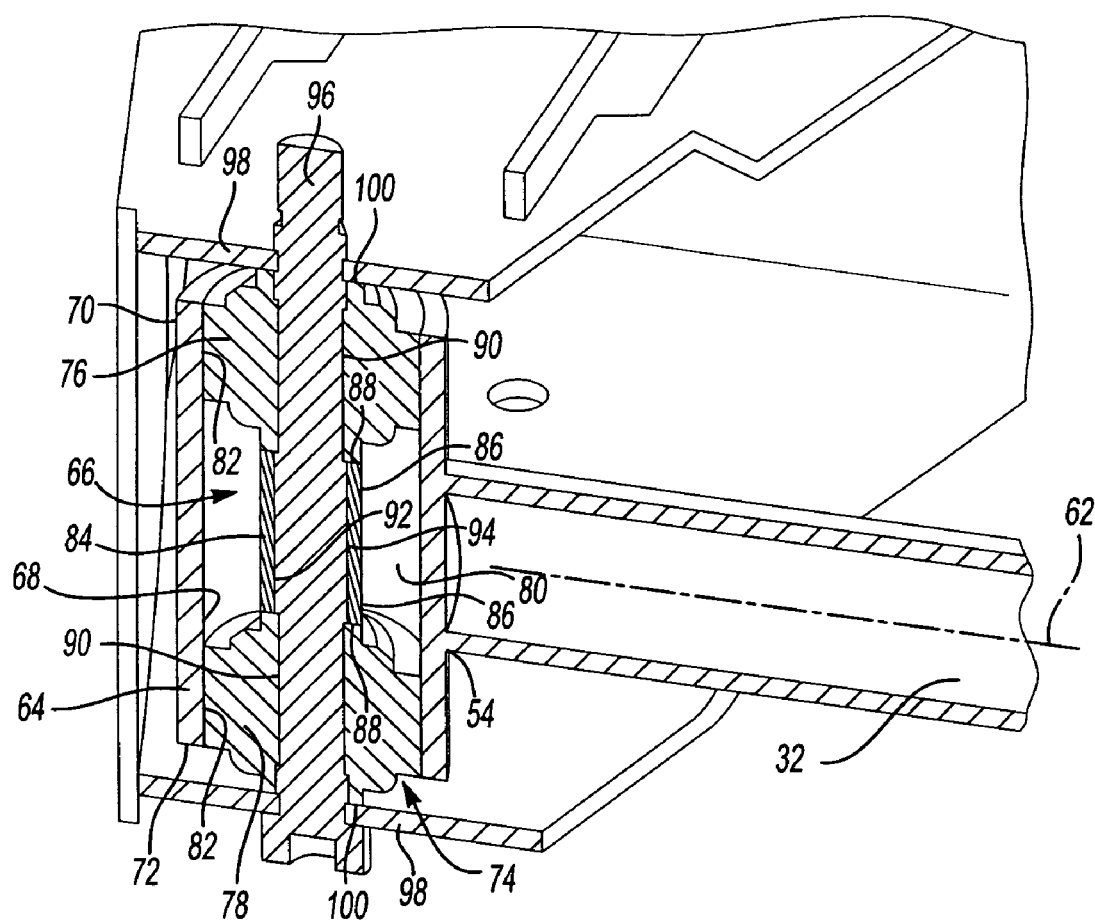
FIG. 3 is a cross-sectional view of one end of a lower control link arm and bushing assembly incorporating the subject invention.

An example of one of the second ends 54 of the lower control link arms 32 is shown in FIG. 3. It should be understood that the first ends 52 of the lower control link arms 32 would be similarly configured. Further, ends of the upper control link arms 30 could also be similarly configured. The lower control link arm 32 defines a longitudinal axis 62 extending along a length of the lower control link arm 32. The second end 54 includes a tubular structure 64 that extends in a lateral direction transverse to the longitudinal axis 62. The tubular structure 64 is preferably orientated such that a T-shape is formed at the second end 54. The tubular structures 64 can be preferably integrally formed with the lower control link arms 32 to form a single piece component. Optionally, the tubular structures could be separately attached to the control link arms.

The tubular structure 64 includes a center bore 66 defined by an inner wall surface 68. The center bore 66 extends from a first end 70 of the tubular structure 64 to a second end 72. A bushing assembly 74 is received within the center bore 66. The bushing assembly includes a first bushing component 76 that is positioned within the center bore 66 at the first end 70 and a second bushing component 78 that is positioned within the center bore 66 at the second end 72. The first 76 and second 78 bushing components are laterally spaced apart from each other to form a clearance 80 at a center of the tubular structure 64.

Each of the first 76 and second 78 bushing components are defined by an outer peripheral surface 82 that abuts directly against the inner wall surface 68 of the tubular structure 64. In the example shown, the first 76 and second 78 bushing components are formed from a resilient or compliant material, however, other types of materials could also be used.

A spacer 84 extends in a lateral direction between the first 76 and second 78 bushing components. Outward ends 86 of the spacer 84 abut against inwardly facing end faces 88 of the first 76 and second 78 bushing components to maintain a clearance 80 between the first 76 and second 78 bushing components. The outer peripheral surfaces 82 of the first 76 and second 78 bushing components are defined by a first diameter, and an outer peripheral surface of the spacer 84 is defined by a second diameter that is less than the first diameter. Thus, the clearance 80 is an open space within the tubular structure 64 that is defined by the inner wall surface 68, the outer peripheral surface of the spacer 84, and an inwardly facing end surface of the first 76 and second 78 bushing components.

The first 76 and second 78 bushing components each include a center bore 90 that is aligned with a center bore 92 of the spacer 84. An attachment element 96, such as a fastener for example, extends through the center bores 90, 92 to secure the second end 54 of the lower control link arm 32 to the bracket 50. The bushing assembly 74 allows the lower control link arm 32 to pivot relative to the bracket 50.

In the example shown in FIG. 3, the bracket 50 includes a pair of ear portions 98 that receive the attachment element 96. The first 70 and second 72 ends of the tubular structure 64 are in close proximity to the ear portions 98 such that outwardly facing end faces 100 of the first 76 and second 78 bushing components abut against the ear portions 98.

Figure 4:
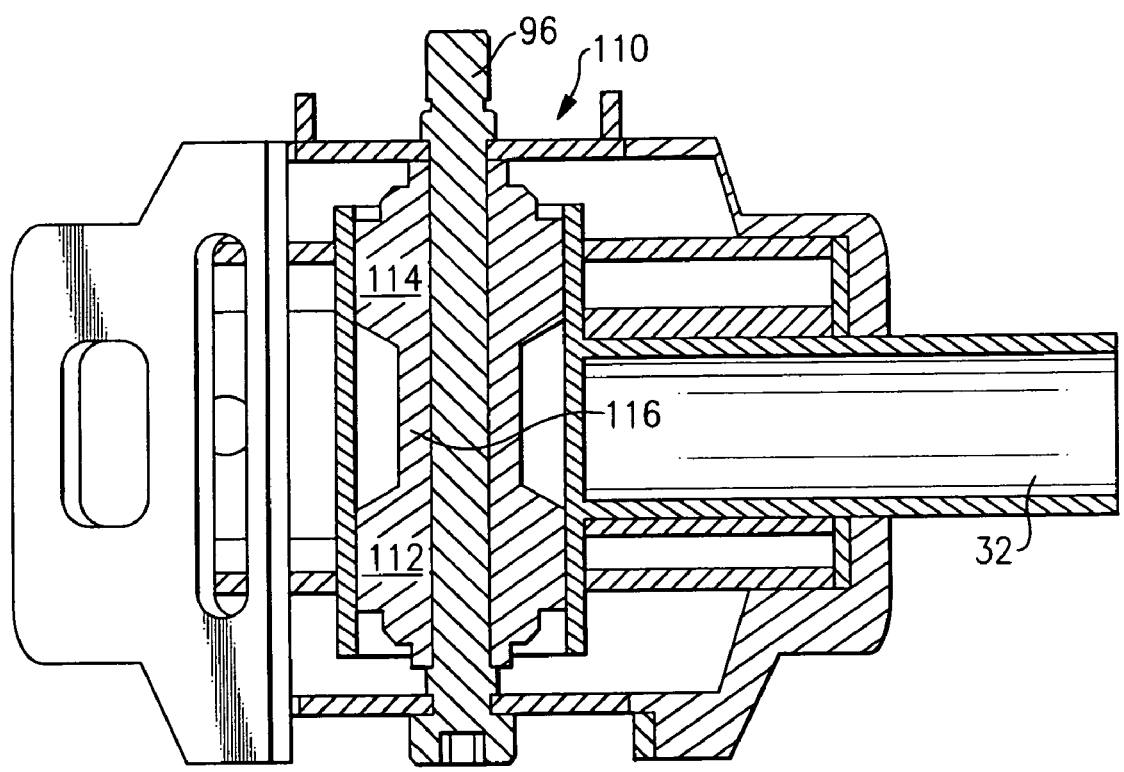
FIG. 4 is a cross-sectional view of another embodiment of a control arm and bushing assembly incorporating the subject invention.

By laterally spacing the first 76 and second 78 bushing components apart from each other by the clearance 80, radial stiffness of the bushing assembly 74 is distributed away from the center of the tubular structure 64. In another example shown in FIG. 4, a bushing assembly 110 is formed to eliminate the need for a separate spacer 84. In this configuration the bushing assembly 110 includes a first bushing 112, a second bushing 114, and a connecting portion 116 that are integrally formed together as a single piece. This configuration operates in a manner similar to the configuration shown in FIG. 3.

The use of the bushing assembly 110 or 74 (76, 78, 84), in combination with the laterally extending T-shaped tubular structure 64, helps build up a desired high conical rate for the bushing assembly 74, 110. Conical compliance is controlled by the extent of roll-over of opposing end portions of the tubular structure 64. This tubular structure 64 and bushing assembly 74, 110 further cooperate to provide auxiliary roll stiffness when the suspension 10 goes through a roll motion. Sufficient roll stiffness is provided such that a sway bar is no longer required resulting in significant weight savings and cost reduction.

Further, tests results have shown that a suspension using the T-shaped tubular structure configuration for roll stiffness, i.e. a suspension without a sway bar, provides suspension characteristics that meet design specifications, and which are equivalent to or which exceed those of a traditional suspension using a sway bar. For example, suspension characteristics such as total roll stiffness (total roll moment per unit axle roll angle), roll steer coefficient (average of left hand side and right hand side steer knuckle angle per unit of jounce travel), and lateral stiffness (total lateral force applied and left and right hand side contact patches per unit of lateral deflection) are all significantly improved in the subject suspension compared to a traditional suspension.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A control link arm for a vehicle suspension assembly comprising:

a link arm body extending in a longitudinal direction along an axis, said link arm body having a first end adapted for connection to an axle component and a second end adapted for connection to a vehicle structure;

at least one tubular structure supported at one of said first and said second ends, said at least one tubular structure extending in a lateral direction transverse to said axis and including a center bore defined by an inner wall surface; and a bushing component received within said at least one tubular structure, said bushing component positioned within said at least one tubular structure such that radial stiffness of said bushing component is distributed away from a center of said at least one tubular structure, and wherein said bushing component is defined by a maximum outer diameter having an outermost peripheral surface that is in direct abutting contact with said inner wall surface of said at least one tubular structure.

2. The control link arm according to claim 1, wherein said bushing component comprises a first bushing member positioned at one end of said at least one tubular structure and a second bushing member positioned at an opposite end of said at least one tubular structure and spaced apart from said first bushing member, said first and said second bushing members each being defined by said maximum outer diameter with each of said outermost peripheral surfaces abutting against said inner wall surface of said at least one tubular structure.

3. The control link arm according to claim 2, wherein said bushing component includes a spacer that separates said first and said second bushing members along a lateral axis, said spacer having an outer diameter that is less than said maximum outer diameter of said first and said second bushing members.

4. The control link arm according to claim 3, wherein said first and said second bushing members and said spacer have aligned openings that receive an attachment member that is adapted to secure said one of said first and said second ends of said link arm body to one of the axle component and the vehicle structure.

5. The lower control link arm according to claim 3, wherein said first bushing member, said second bushing member and said spacer are integrally formed together as a single piece component.

6. The control link arm according to claim 2, wherein said at least one tubular structure is defined by a laterally extending length through which said center bore extends, and wherein said laterally extending length is a greater distance than a distance defined by said maximum outer diameter of said first bushing member plus said maximum outer diameter of said second bushing member.

7. The control link arm according to claim 1, wherein said at least one tubular structure comprises a first tubular structure supported at said first end and a second tubular structure supported at said second end with said bushing component being received within said first tubular structure and including another bushing component received within said second tubular structure.

8. The control link arm according to claim 7, wherein said first and said second tubular structures form T-shapes at said first and second ends of said link arm body, each of said T-shapes having a first portion extending outwardly from one side of said link arm body by a first length and a second portion extending outwvardly from an opposite side of said link arm body by a second length, and wherein said bushing component comprises a first bushing member substantially positioned in said first portion of said T-shape and a second bushing member substantially positioned in said second portion of said T-shape and spaced apart from said first bushing member.

9. The control link arm according to claim 1, wherein said at least one tubular structure is defined by a laterally extending length through which said center bore extends, and wherein said laterally extending length is a greater distance than a distance defined by said maximum outer diameter.

10. The control link arm according to claim 1, wherein said bushing component defines a contact length between said bushing component and said inner wall surface of said at least one tubular structure and wherein said maximum outer diameter of said bushing component is formed near a mid-point of said contact length.

11. A vehicle suspension assembly comprising:
an upper control link arm extending in a longitudinal direction, said upper control link arm having a first upper end adapted for connection to an axle component and a second upper end adapted for connection to a vehicle structure;
a lower control link arm positioned vertically below said upper control link arm and extending in the longitudinal direction along an axis, said lower control link arm having a first lower end adapted for connection to the axle component and a second lower end adapted for connection to the vehicle structure;
at least one tubular structure supported by at least one of said first and said second lower ends and said first and said second upper ends, said at least one tubular structure including a center bore defined by an inner rail surface and extending in a lateral direction transverse to said axis; and
a bushing assembly received within said at least one tubular structure, said bushing assembly including a first bushing component positioned at one end of said tubular structure and a second bushing component positioned at an opposite end of said tubular structure and separated from said first bushing component by a clearance such that a radial stiffness of said bushing assembly is distributed away from a center of said at least one tubular structure, and wherein said first and said second bushing components are each defined by a maximum outer diameter having an outermost peripheral surface that is in direct abutting contact with said inner wall surface of said at least one tubular structure.

12. The vehicle suspension assembly according to claim 11, wherein the vehicle suspension assembly comprises an anti-sway bar suspension with said at least one tubular structure and said bushing assembly cooperating to provide sufficient roll stiffness for the vehicle suspension assembly without requiring a sway bar.

13. The vehicle suspension assembly according to claim 11, wherein said bushing assembly includes a spacer extending laterally between said first and said second bushing components such that opposing ends of said spacer are in abutting contact with corresponding end faces of said first and said second bushing components.

14. The vehicle suspension assembly according to claim 13, wherein said spacer includes an outer circumferential surface defined by a diameter that is less than said maximum outer diameters of said first and said second bushings such that the clearance is formed between said outer circumferential surface of said spacer, said inner wall surface of said at least one tubular structure, and said corresponding end faces of said first and said second bushing components.

15. The vehicle suspension assembly according to claim 13, including an attachment member extending through aligned openings in said spacer and said first and said second bushing components, said attachment member for connecting said at least one of said first and said second lower ends and said first and said second upper ends to a corresponding one of the vehicle structure and axle component.

16. The vehicle suspension assembly according to claim 11, wherein said at least one tubular structure comprises a first tubular structure supported at said first lower end and a second tubular structure supported at said second lower end and wherein said bushing assembly comprises a first bushing assembly received within said first tubular structure and a second bushing assembly received within said second tubular structure, said first and said second bushing assemblies each including one of each of said first and said second bushing components.

17. The vehicle suspension assembly according to claim 16, including a connecting element extending between said first and said second bushing components wherein said first bushing component, said second bushing component, and said connecting element are integrally formed together as a single piece component.

18. The vehicle suspension assembly according to claim 11, including a mounting member for connecting said at least one of said first and said second lower ends and said first and said second upper ends to a corresponding one of the vehicle structure and axle component, said mounting member including a pair of laterally spaced ears positioned in close proximity to said one end of said tubular structure and to said opposite end of said tubular structure.

19. The vehicle suspension assembly according to claim 18, wherein outward end faces of said first and said second bushing components abut against said pair of laterally spaced ears.

20. The vehicle suspension assembly according to claim 11, including an axle mount structure that secures at least one of said lower and upper control link arms to the axle component, said axle mount structure having a first attachment interface that attaches to an end of said at least one of said lower and upper control link arms and a spring support member that supports an air spring.

21. The vehicle suspension assembly according to claim 11, wherein said at least one tubular structure forms a T-shape, said T-shape having a first portion extending outwardly from one side of an associated one of said upper or lower control link arms by a first length and a second portion extending outwardly from an opposite side of said associated one of said upper or lower control link arms by a second length, and wherein said first bushing component is substantially positioned in said first portion of said T-shape and said second bushing component is substantially positioned in said second portion of said T-shape and spaced apart from said first bushing component.

22. The vehicle suspension assembly according to claim 21, wherein said first bushing component defines a first contact length between said first bushing component and said inner wall surface of said at least one tubular structure and said second bushing component defines a second contact length between said second bushing component and said inner wall surface of said at least one tubular structure, and wherein said maximum outer diameter of said first bushing component is formed near a mid-point of said first contact length and said maximum outer diameter of said second bushing component is formed near a mid-point of said second contact length.

23. The vehicle suspension assembly according to claim 11, wherein said at least one tubular structure is defined by a laterally extending length through which said center bore extends, and wherein said laterally extending length is a greater distance than a distance defined by said maximum outer diameter of said first bushing component plus said maximum outer diameter of said second bushing component.

\* \* \* \* \*